United States Patent [19]

Brissé et al.

[11] Patent Number: 4,564,840

[45] Date of Patent: Jan. 14, 1986

[54] RADIONAVIGATION SYSTEM HAVING MEANS FOR CONCEALING DISTANCE AND/OR BEARING INFORMATION CONVEYED THEREBY

[76] Inventors: Jacques D. Brissé, Longchêe, Bullion, 78830 Bonnelles; Jean-Pierre J. Chevalier, Saint Laurent la Gâtine, 78210 Nogent le Roi, both of France

[21] Appl. No.: 879,271

[22] Filed: Feb. 13, 1978

[30] Foreign Application Priority Data

Feb. 16, 1977 [FR] France .................. 77 04378

[51] Int. Cl.[4] .................. G01S 9/56; G01S 13/74
[52] U.S. Cl. .................. 343/6.5 LC
[58] Field of Search .......... 343/106 R, 112 D, 6.5 R, 343/6.5 LC; 325/32

[56] References Cited

U.S. PATENT DOCUMENTS

| | | | |
|---|---|---|---|
| 2,796,602 | 6/1957 | Hess et al. | 325/32 |
| 3,114,145 | 12/1963 | Vielle et al. | 343/6.5 R |
| 3,680,117 | 7/1972 | Eckert et al. | 343/106 R |
| 3,818,478 | 6/1974 | Groginsky | 343/106 R |
| 3,900,867 | 8/1975 | Wagner | 343/6.5 LC |
| 3,921,121 | 11/1975 | Huisveld, Jr. et al. | 343/6.5 R |

Primary Examiner—Theodore M. Blum
Attorney, Agent, or Firm—Karl F. Ross; Herbert Dubno

[57] ABSTRACT

A ground station of a radionavigation system, responding to interrogation pulses from aircraft passing within range, emits message pulses whose timing enables the on-board equipment of the interrogating aircraft to determine its distance from the ground station and/or its azimuthal position relative thereto. To prevent such information from being utilized by aircraft not entitled thereto, the emission of the message pulses is subjected to an artificial delay whose randomly varying magnitude is conveyed by a multibit code word subjected in a distorter to a predetermined series of transformations based upon selected bits thereof. The on-board equipment of privileged aircraft includes a decipherer complementary to the distorter which restores the original code word and derives from it an indication of the artificial delay to be deducted from the measured time interval.

10 Claims, 9 Drawing Figures

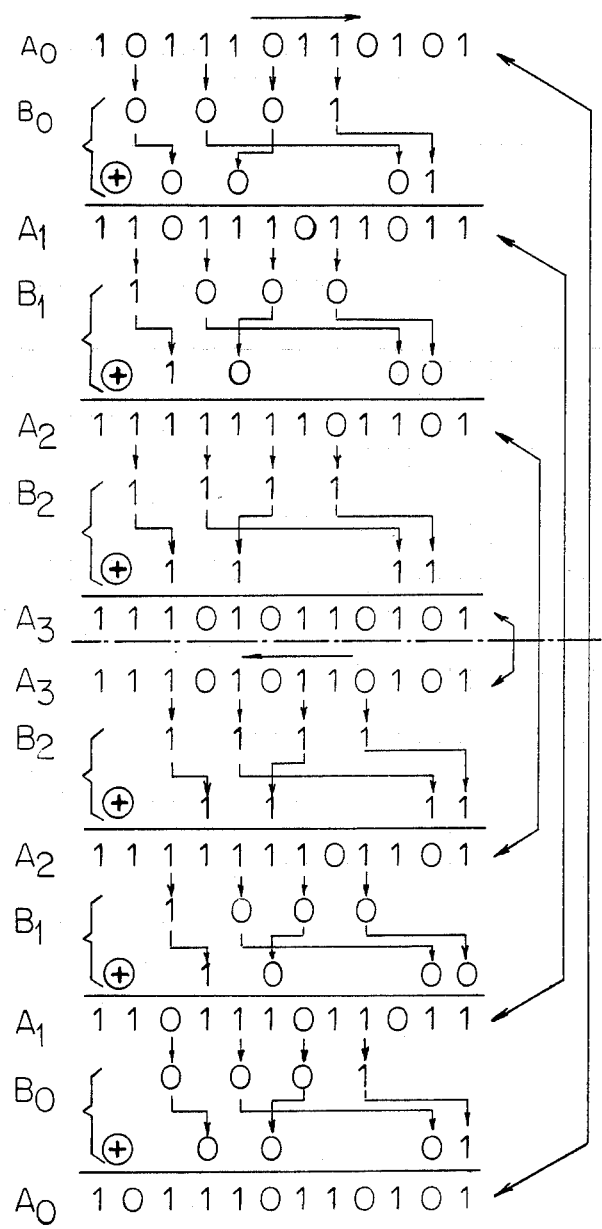
FIG. 3
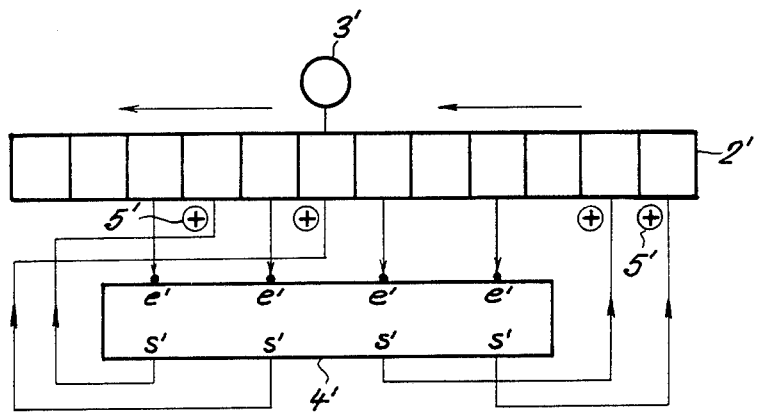
FIG. 2
FIG. 4

RADIONAVIGATION SYSTEM HAVING MEANS FOR CONCEALING DISTANCE AND/OR BEARING INFORMATION CONVEYED THEREBY

FIELD OF THE INVENTION

Our present invention relates to a radionavigation system in which a central ground station or beacon emits messages containing information which, upon being detected and recognized by suitably equipped aircraft, permits them to determine inter alia the coordinates—distance [range] D and/or bearing. Radionavigation systems of this type, operating as secondary radars and comprising an interrogator on board each aircraft of the system and a responder in the beacon, are internationally known under the acronyms DME (for "Distance-Measuring Equipment") and TACAN (for "Tactical Air Navigation").

BACKGROUND OF THE INVENTION (I) Preamble:

In the DME system referred to above, an on-board emitter/interrogator sends out, at every azimuth, pairs of interrogation pulses whose carrier frequency is characteristic of a ground beacon equipped with a responder. The responder receives the interrogation signal, detects it and recognizes the pairs of interrogation pulses, and utilizes them to form other pairs of response pulses on another carrier frequency which can be received, detected and recognized by the receiver of the on-board apparatus. The time lapse t between the leading edges of the interrogation pulses and the response pulses received on board provides the distance information.

The time t increases linearly as a function of the distance D between the interrogator and the responder; t is not zero at the same time as D since the two equipments and in particular the responder introduce certain delays for the transmission and for the processing of the emitted or received signals. The equipment of the responder is adjusted with the aid of delay lines so as to introduce a predetermined delay time $t_o$; thus, the distance D is given by the relationship $D=(t-t_o)(c/2)$ where c represents the speed of light.

In the TACAN system the TACAN (abbreviation of the English designation "Tactical Air Navigation") the interrogating aircraft receives from the responder two messages which enable it to determine its distance D and its bearing G with reference to that responder.

The distance-measuring operation in the TACAN system is assured by means rather similar to those which are put into use in the DME system; accordingly, in the following description there will be considered only, to establish the terms and to specify certain orders of magnitude, the actual characteristics of TACAN as they are defined in the standards "MIL" edited by the U.S. Defense Department.

Every aircraft equipped with an on-board apparatus conforming to the TACAN standards can interrogate a beacon and receive from it information on distance and bearing, which could be very inconvenient in a system for military use.

OBJECT OF THE INVENTION

The object of the present invention is to mitigate this drawback by introducing, on the part of the beacon, errors of distance and possibly errors of bearing and providing both in the beacon and on privileged aircraft, authorized to receive positional information, means serving, on the one hand, the magnitude of the intentionally introduced errors and, on the other hand, to eliminate these errors in order to obtain the exact information.

It should be noted that, on board, the secrecy of bearing information is less important than that of distance information since it suffices to utilize a common goniometer tuned to the beacon frequency to obtain in another manner the bearing information. This is why in the following description we shall concentrate on the means according to the invention for assuring the secrecy of the distance information even though such means could also be utilized mutatis mutandis for the concealment of the bearing information.

SUMMARY OF THE INVENTION

According to a feature of our invention, the beacon, instead of transmitting distance information after the processing time $t_o$, sends it out only after a time $t_o+T_d$; thus, the aircraft measures a distance with a fixed error $\delta=(c/2)T_d$.

This artificial delay $T_d$ must vary in a random fashion during utilization so as to assume successive values $T_d'$, $T_d''$, $T_d'''$ etc.

According to another feature of the invention there are provided automatic means:

on the part of the on-board apparatus, for receiving information on the actual value of delay $T_d$ ($T_d'$ or $T_d''$ or $T_d'''$ ... etc.), storing this value and subtracting it from the apparent measure of distance $D_a$ in order to obtain the true distance D ($D=D_a-\delta$); and on the part of the beacon, for processing the delay $T_d$ and generating the signal which indicates its magnitude to the on-board apparatus of properly equipped aircraft.

According to a more particular feature of the invention, applicable to the TACAN system, the bearing messages sent out by the beacon are delayed by a fixed amount $T_g$ which, however, can vary in random fashion during utilization so as to assume successive values $T_g'$, $T_g''$, $T_g'''$ ... etc., these delays being obtained by acting upon the synchronization of the principal and auxiliary reference pulses emitted in such a system. Mutatis mutandis, these bearing errors $\gamma$ are processed by the suitably equipped beacon and the on-board apparatus in a manner similar to the handling of the distance errors in order to obtain the true bearing G ($G=G_a-\gamma$).

According to a further feature of our invention, the errors of distance $\delta$ and of bearing $\gamma$ are made practically nondecipherable for any on-board apparatus which is not suitably equipped, by virtue of a cascade of codings and a random mutation of the error words sent out by the beacon.

Stated in more general terms, our improved radionavigation system has a ground station or beacon which includes transmission means responsive to interrogation pulses from passing aircraft for emitting outgoing signals enabling evaluating means aboard such aircraft to derive positional information (distance and/or bearing) from the timing of these signals. An artificial delay ($T_d$) is introduced by error-generating means at the ground station into the emission of the outgoing signals to falsify the positional information conveyed thereby, the transmission means of that ground station receiving from the error-generating means a binary message representing the magnitude of the artificial delay in coded form for communication to on-board equipment of interrogating aircraft. In the case of aircraft privileged to receive the true positional information, the on-board equipment includes error-eliminating means for extracting the magnitude of the artifical delay ($T_d$) from the incoming binary message and controlling the associated evaluating means to correct the falsified positional information derived from the signals emitted by the ground station.

As more fully described hereinafter, the error-generating means at the ground station advantageously comprises a source of randomly generated error words, first storage means for preserving over a predetermined period (S) an original error word ($M_o$) generated at the beginning of such period, encoding means for subjecting this original error word to a predetermined series of transformations in order to produce a modified error word ($M_s$) to be communicated to the on-board equipment as part of the aforementioned binary message, and timing means connected to the first storage means for establishing the artificial delay ($T_d$) under the control of the original error word ($M_o$). The error-eliminating means of the on-board equipment comprises decoding means complementary to the error-generating means of the ground station for subjecting the modified error word ($M_s$) received with the binary message to a series of reverse transformations restoring the original error word ($M_o$), second storage means for temporarily preserving the restored error word ($M_o$), and corrective means connected to the latter storage means for eliminating the artificial delay ($T_d$) under the control of the restored error word.

As will become apparent hereinafter, the timing means at the ground station may comprise a reference oscillator working into a cascade of frequency dividers whose outputs are connected to data inputs of a multiplexer having address inputs which receive the bits of the original error word ($M_o$) contained in the first storage means. The corrective means aboard the aircraft may comprise a similar assembly of reference oscillator, cascaded frequency dividers and multiplexer but could also be more simply represented by a binary subtractor receiving positional-information bits from the associated evaluating means and diminishing the numerical value thereof by that of the restored error word ($M_o$).

With specific consideration of the distance error, the preferred mode of realization of the invention can be characterized in the following manner.

(a) Operation of beacon:

The beacon or ground station generates in random fashion, at instants separated by uniform intervals S, an error-support code word $A_o$ consisting of n bits, n being determined, starting with the maximum number of different codes which can be emitted during a given period J, by the relationship: $2^{n-1} \leq (J/S) \leq 2^n$.

The actual error word $M_o$—representing the delay $T_d$—consists of bits taken from p first fixed positions of word $A_o$ which makes it possible to obtain up to $2^p$ possible values of errors $\delta = (c/2)T_d$.

Error word $M_o$ is modified with the aid of a local transcoding matrix whose outputs carry a word $B_o$ of p bits transformed from word $M_o$. Support word $A_o$ is written in the n stages of a local shift register closed upon itself; and on a first clock cycle the word $B_o$ is digitally superposed (by addition "modulo 2", i.e. without carry) upon the bits written in respective stages of the register, defining p second fixed positions so as to form a new support word $A_1 = A_o \oplus B_o$.

Concurrently, the bits of the support word $A_1$ are shifted by one stage in a certain direction within the register whereupon the procedure is repeated, giving rise after s clock cycles to a p-bit error word $M_{s-1}$ which, transformed into $B_{s-1}$, is superimposed upon the bits of the p second positions as described above so as to constitute a final error-support word $A_s = A_{s-1} \oplus B_{s-1}$.

If $s \geq n$, all the bits of the word $A_o$ will have been subjected at least once to the modification procedure and the addition "modulo 2" so that the final error word $M_s$ of p bits is, in principle, as random as the initial n-bit support word $A_o$.

An error-support word so treated is emitted at times O, S, 2S, . . . kS in the form of several trains of (n+q) pulses, q being the number of supplemental pulses of a characteristic prefix, each pulse position of a train being separated from its neighbor by an interval u.

Each time, the initial error word $M_o$ representing the delay $T_d$ is stored. It is subsequently utilized for programming, upon the emission of responses to the interrogations, a generator of programmable delays which introduces the supplemental delay $T_d$ into these responses.

(b) Operation of on-board apparatus:

After having been put into shape, the received error-support word $A_s$ of n bits originating at the beacon is decoded and restored. For this purpose, word $M_{s-1}$ is reconstituted with the aid of another transcoding matrix—similar to that of the ground station—whose outputs carry the word $B_{s-1}$ of p bits transformed from word $M_{s-1}$. The incoming word $A_s$ is written in the n stages of a second shift register closed upon itself, whose stages again define p first and p second fixed bit positions yet whose clock is so connected that the bits circulate in a relatively inverted direction during each shift. At the first clock pulse the word $B_{s-1}$ is digitally superimposed (by addition "modulo 2") upon the bits present in the p second positions of the airborne register to form a support word $A_s' = A_s \oplus B_{s-1} = (A_{s-1} \oplus B_{s-1}) \oplus B_{s-1} = A_{s-1} \oplus (B_{s-1} \oplus B_{s-1}) = A_{s-1}$.

It will thus be understood that after s clock pulses and as many shifts in this reverse direction one finds the initial support word $A_o$, with the actual error word $M_o$ appearing in the outputs of the stages representing the p first bit positions.

The recovered error word $M_o$ is subsequently utilized to program, upon the reception of responses from the beacon, a programmable delay generator which produces a delay $T_d$; this delay $T_d$ is abstracted, by any suitable means, from the delay t measured by the on-board apparatus.

Orders of Magnitude and Advantages of the Proposed Devices

The orders of magnitude of parameters S, J, n, u, p, s can be derived from practical considerations which also put into focus the advantages of the arrangement according to the invention and particularly those of the proposed mutation system. When specifying J=24 hours and S=30 seconds, one finds n=12 (2048<28-80<4096); for practical reasons relating to the size and shape of the emitted pulses, one cannot adopt too small a value for u and therefore will choose a magnitude of the order of tens of $\mu$s but with avoidance of the values of 12, 15 and 36 $\mu$s which characterize the interrogations and/or responses standardized in TACAN.

An error-support word $A_o$ of 12 random bits should permit up to $2^{12}=4096$ different error codes. However, a word $A_o$ constituted by this 12-bit code, in the absence of mutation, can be easily decoded, interpreted and utilized by any on-board apparatus equipped with a very simple computer processing each code in one μs since the operation would not require more than 4 milliseconds.

This is why the arrangement according to the invention becomes interesting when the mutation system referred to above is associated therewith.

The number p of fixed positions chosen in the support word of n bits defines $2^p$ possible error words $M_o$. The shortest error corresponding to 1 should be so chosen that $(c/2)(T_d)_{min}$ is large enough with reference to the smallest increment measured by the on-board apparatus, equaling 1/80 neutical mile; the longest error corresponding to $2^p$ should be such that $(c/2)(T_d)_{max}$ is sufficiently small with reference to the maximum range of the system—which may be about 200 nautical miles.

It is convenient to choose for the shortest error a value close to the geometric mean between the smallest increment and the largest range, i.e.: $(c/2)(T_d)_{min} \approx 1.58$ nautical miles whence $(T_d)_{min} \approx 19.5$ μs.

In view of the digital character of the measuring system one chooses $(T_d)_{min}$ more precisely in such a way that $$\frac{\frac{c}{2}(T_d)_{min}}{\frac{1}{80}}$$

be equal to the closest power of 2.

In the specific instance, we find a ratio of $2^7$ whence $(T_d)_{min} = 19.75$ μs $[(c/2)(T_d)_{min} = 1.6$ nautical miles].

The largest error $(c/2)(T_d)_{max}$ may be reasonably chosen in the same way by taking a value close to the geometric mean between the maximum range (200 nautical miles) and $(c/2)(T_d)_{min}$ (1.58 nautical miles), which gives $$\frac{(T_d)_{max}}{(T_d)_{min}} \approx 11.2$$

Once again, taking into account the digital character of the system, one will choose $(T_d)_{max}$ in such a way that $(T_d)_{max}/(T_d)_{min}$ is a power of 2 close to 11.2, thus 16 in this case; p is therefore defined as having the value 4.

There exist, accordingly, 16 possible values of errors which are multiples of the smallest one corresponding to 1.6 nautical miles (i.e. from 1.6 to 25.6 nautical miles).

The choice of 8 (p=3) would result in too low a number of possible error values; the choice of 32 (p=5) leads to a value $(c/2)(T_d)_{max}$ equal to 51.2 nautical miles and thus to an excessive reduction of the theoretical maximum range of the system.

Other considerations now to be developed justify the choice of p=4 in preference to p=3 or p=5.

The transcoding matrix assigns to an error word M of p bits another, transformed word B also of p bits. This matrix, composed of $2^p$ lines and $2^p$ columns, has a number of coding combinations on the order of $(2^p)^{2^p}$, i.e.:

17·10^6 combinations if p=3

1.8·10^19 combinations if p=4

A high-power computer trying all the possible combinations at the rate of one microsecond per combination would determine the coding key in only 17 seconds if p=3 and in several years if p=4.

The choice of p=4, thus of a transcoding matrix of 16 columns and 16 lines, therefore yields a practically undecipherable message.

It should be noted that, aside from an encoding obtained with the aid of a transcoding matrix, other encoding modes exist in the proposed system.

One of these modes resides in the choice of p first positions among the n overall bit positions as a source of the error word $M_o$ and in the choice of p second positions amid the (n−p) remaining ones on which the additions "modulo 2" of the transformed word $B_o$ are carried out.

The number of possible choices is then equal to $C_n^p \cdot C_{n-p}^p$, or $\binom{n}{p}\binom{n-p}{p}$, i.e. 34,650 if n=12 and p=4.

The other possible encoding mode resides in the choice of s which can lie between n and a rather high number N such as 1000, for example.

With the latter value of N the number of possible choices corresponding to two other encodings is on the order of 30·10^6.

These ancillary encodings are therefore clearly less effective than those obtained by the use of the transcoding matrix; in practice, moreover, the change of keys in those instances (p first positions, p second positions, s) is less convenient than a modification of the transcoding key.

BRIEF DESCRIPTION OF THE DRAWING

The above and other features of our invention will now be described in detail, for an embodiment applied to a system of the TACAN type, with reference to the accompanying drawing in which:

FIG. 2 represents a table giving a coding key;

FIG. 3 represents a flow chart explaining the transformation of an error-support word $A_o$ during encoding and decoding;

FIG. 4 represents a diagram of a decoding device for the error-support word in the on-board apparatus;

SPECIFIC DESCRIPTION

Figure 1:
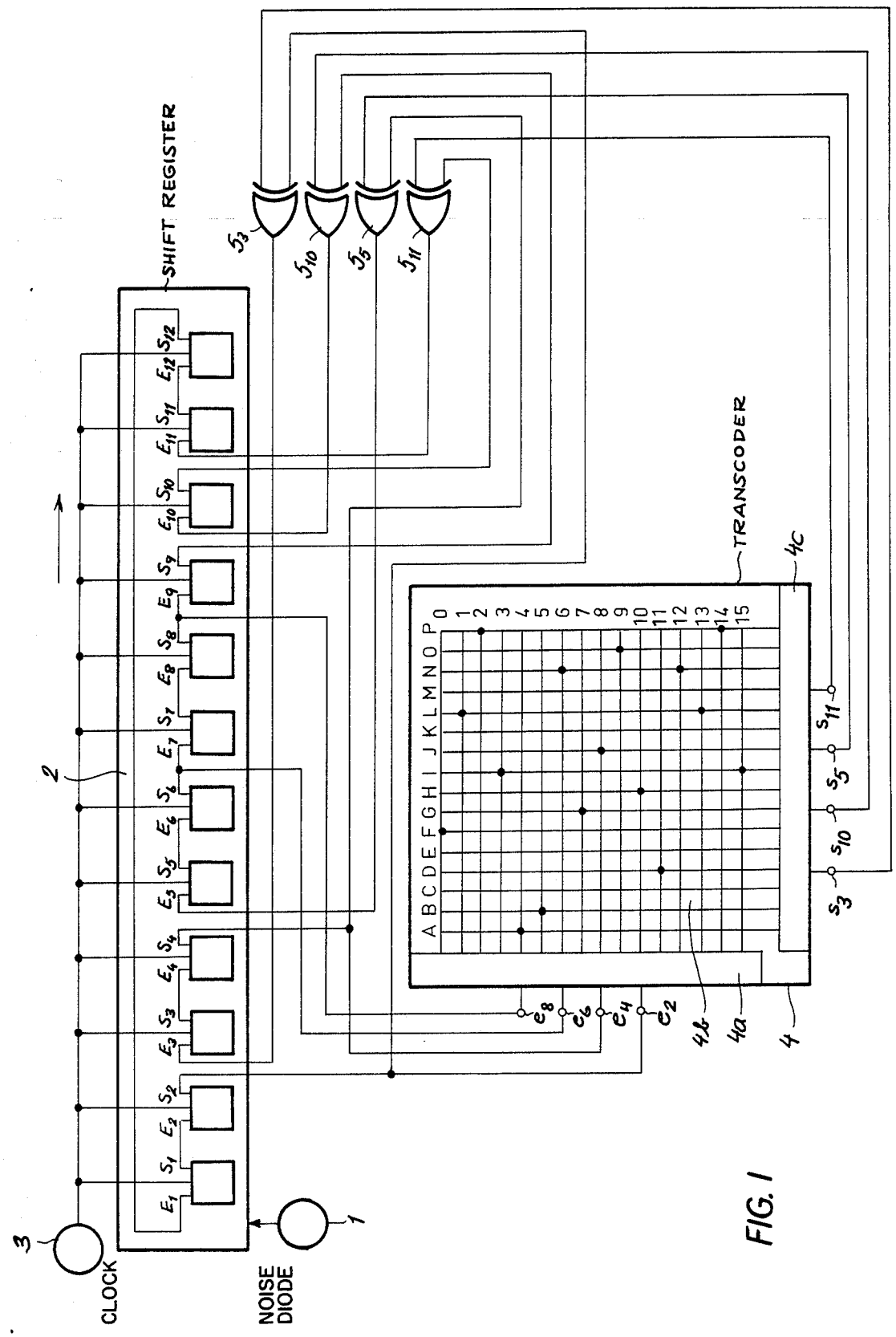
FIG. 1 represents a device for creating an error word $M_o$ and for encoding it in the beacon.

As schematically indicated in FIG. 1, the word $A_o$ in representing the artificially introduced delay $T_d$, consists of n=12 bits.

Word $A_o$ originates at a noise diode 1 which loads with 12 random bits the 12 stages of a shift register 2 in response to 12 pulses from a clock 3. At the end of loading, the access of noise source 1 to the input of the register is interrupted by any suitable conventional means.

Register 2 is looped back upon itself and, with each clock cycle, the bits inscribed on its stage outputs progress by one stage in a predetermined direction, here from left to right.

With the stage outputs of the cyclic register 2 designated $S_1$ to $S_{12}$ and its stage inputs designated $E_1$ to $E_{12}$ in this shift direction, a group of p=4 outputs representing the p first bit positions—e.g. $S_2$, $S_4$, $S_6$, $S_8$—are respectively connected to the p inputs $e_2$, $e_4$, $e_6$, $e_8$ of a transcoder 4 which is provided with p outputs $s_3$, $s_{10}$, $s_5$, $s_{11}$.

Transcoder 4 comprises a binary-decimal decoder $4a$ whose $2^p=16$ outputs are connected to the $2^p$ rows of a transcoding matrix $4b$, and a decimal-binary coder $4c$ whose $2^p$ inputs are connected to the $2^p$ columns of matrix $4b$.

In the initial state, with the support word $A_o$ inscribed in register 2, this first group of stage outputs, $S_2$, $S_4$, $S_6$, $S_8$ carry the word $M_o$ representing the delay $T_d$. On the p outputs of transcoder 4 there appears the word $B_o$ transformed from error word $M_o$ by the transcoding key.

The p outputs of transcoder 4 are each connected to one of the two inputs of a respective "EXCLUSIVE OR" gate $5_3$, $5_{10}$, $5_5$ and $5_{11}$ working into the p second bit positions. The p other inputs of the XOR gates are respectively connected to a second group of stage outputs $S_2$, $S_9$, $S_4$, $S_{10}$ of register 2. The stage outputs $S_1$, $S_3$, $S_5$, $S_6$, $S_7$, $S_8$, $S_{11}$ and $S_{12}$ are directly joined to the inputs $E_2$, $E_4$, $E_6$, $E_7$, $E_8$, $E_9$, $E_{12}$ and $E_1$ of the next-following register stages. With the outputs of XOR gates $S_3$, $S_5$, $S_{10}$ and $S_{11}$ tied to stage inputs $E_3$, $E_5$, $E_{10}$ and $E_{11}$, these gates are respectively inserted between the second and third, fourth and fifth, ninth and tenth, and tenth and eleventh register stages.

Under these conditions, taking into account the properties of "modulo 2" addition of the XOR gates, upon the first clock cycle the word $B_o$ is added (without a carry) on the stage inputs $E_3$, $E_{10}$, $E_5$, $E_{11}$ to the word $A_o$ which advances by one stage toward the right.

Upon a second clock cycle, the word $B_1$ is added in like manner on the stage inputs $E_3$, $E_{10}$, $E_5$, $E_{11}$ to the word $A_1$, etc. Upon the $s^{th}$ clock cycle, the word $B_{s-1}$ is added on these same inputs to the word $A_{s-1}$ which progresses by one stage toward the right with reference to its position after the $(s-1)^{th}$ clock cycle.

The initial error word $M_o$ is stored so as to add the delay $T_d$, represented by it, to the responses subsequently transmitted.

The distorted support word $A_s$ obtained after the $s^{th}$ clock cycle, encompassing a modified error word $M_s$, is transmitted toward the on-board equipment in the form of several trains of $(n+q)$ pulses, the q (e.g. 3) leading pulses constituting a characteristic prefix which introduces the support word $A_s$.

Let us assume, more specifically, that the transcoding matrix $4b$ operates according to the key represented at left in FIG. 2, the words M of the left-hand column being carried on the inputs $e_2$, $e_4$, $e_6$, $e_8$ and the words B of the right-hand column appearing on the outputs $s_3$, $s_{10}$, $s_5$, $s_{11}$ of coder $4c$.

In FIG. 1 the 16 rows of the matrix 4 have been identified by the numbers 0 to 15 and the 16 columns by the letters A to P.

At right in FIG. 2 there have been shown the connections to be established at the intersections of certain rows (word M) and columns (word B). These connections are represented by black dots in the matrix $4b$ of FIG. 1.

For a better understanding of the process of formation of the support word $A_s$, starting with an initial support word $A_o$, there are schematically illustrated at the top of FIG. 3 the transformations of A a generic word in the course of three clock cycles. Each of these transformations is represented on three rows: first the word A; then the bits of the word B appearing on the coder outputs $s_3$, $s_{10}$, $s_5$ and $s_{11}$ (FIG. 1) and resulting from the transformation by matrix $4b$ of the error word M appearing on the stage outputs $S_2$, $S_4$, $S_6$, $S_8$ of register 2 (the transformations are given by the table of FIG. 2); finally, the word B carried on the inputs of the gates circuits $5_3$, $5_{10}$, $5_5$ and $5_{11}$ of FIG. 1 that are to be added ("modulo 2") to the error-support word A which progresses by one stage after the clock cycle.

The transformed support word $A_s$ (here $A_3$) is transmitted, as already said, on trains of $(q+n)$ pulses. Whatever the structure of the on-board apparatuses, those which are equipped with devices according to the invention must necessarily comprise a decipherer which restores the error word $M_o$.

After detection and reshaping of the train of $(q+n)$ pulses, the support word $A_3$ is treated by a decipherer which in general terms has the same structure as the distortion circuit of the beacon (FIG. 1).

This decipherer is functionally represented in FIG. 4; the elements which are equivalent to those of FIG. 1 have corresponding reference numerals provided with a prime mark (').

Word $A_3$ is inscribed in the 12 stages of a cyclic shift register 2'; the displacement performed by a clock 3' is here effected from right to left. The four first bit positions correspond this time to the stages 3, 5, 7, 9 (in lieu of 2, 4, 6, 8) containing the group of bits which constitutes the modified error word $M_s$; they are connected to the inputs of a transcoder 4' whose matrix has the same key as that of the beacon (table of FIG. 2). The outputs of transcoder 4' are directed by logic circuits 5', i.e. XOR gates, toward the stages Nos. 4, 11, 6, 12 (in lieu of Nos. 3, 10, 5, 11) corresponding to the four second bit positions.

There occurs thus, with reference to the situation in the beacon, a one-stage shift of the four first and the four second bit positions toward the right.

In the lower part of FIG. 3 we have shown the transformations of the support word $A_3$ after 1, 2 and 3 clock cycles. There eventually appears the original error-support word $A_o$ generated by the beacon and, on the outputs of stages 2, 4, 6 and 8, the actual error word $M_o$; this is the word representing the delay $T_d$ which, by any suitable means, is stored in the on-board apparatus to program the airborne delay generator which determines the reduction of the incremented delay t ultimately measured by the on-board apparatus.

We shall now examine the means for producing:
on the part of the beacon, starting with the error-support word $A_o$, the trains of $(q+n)$ pulses which carry the word $A_s$ and the delay $T_d$ corresponding to error word $M_o$;
on the part of the on-board apparatus, the means for utilizing the word $M_o$ and for inserting it in the distance-measuring equipment.

THE BEACON

The beacon is equipped with a chronometric assembly which, under the control of a clock, enables the following operations to be performed:
 filling the register 2 with noise,
 storing the error word $M_o$ of $p=4$ bits extracted in the p first positions,
 circulation in the register 2 (s times).

The chronometric assembly is set in operation by a Morse code which is periodically emitted by the beacon; the repeated emission of the trains of $(q+n)$ pulses which carry the support word $A_s$ is under the control of an internal clock realized for example by successive divisions of an elevated frequency, in order to obtain the interval u (here 17 μs).

The error word $M_o$ stored in the beacon corresponds to the error time $T_d$ which must be added to the delay $t_o$ in the responses furnished to the interrogations. This time $T_d$, as has been seen, is one of $2^p$ multiples of an elemental time $(T_d)_{min}$ which, in this instance, has been chosen equal to 19.75 μs. This duration must be defined with a precision better than ±0.05 μs in order not to alter significantly the distance measurement in the on-board apparatus.

The conventional use of a shift register as a delay generator programmable by the word $M_o$ is practically impossible since, with a clock of $(10^6/0.05)$ Hz=20 MHz, this register would have to have close to 400 stages.

Figure 5:
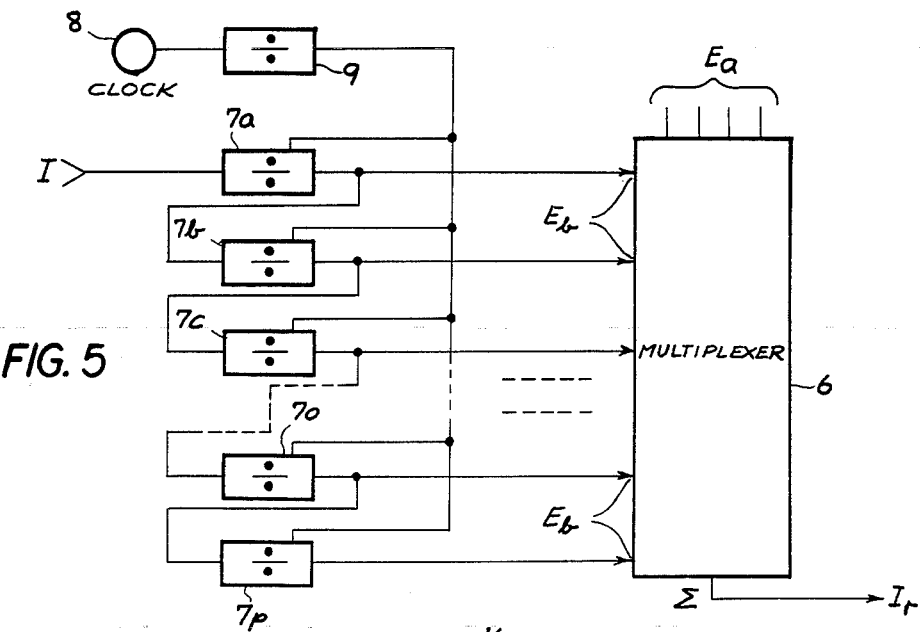
FIG. 5 represents the diagram of a delay generator programmed by the error word $M_o$.

In the realization of the device according to the invention, the following solution has been preferably adopted (see FIG. 5):

The error word $M_o$ of p bits is inscribed on the p address inputs $E_a$ of a multiplexer 6. The interrogation received by the beacon is decoded and furnishes a pulse I which triggers a divider 7a of division factor $P=(T_d)_{min}\cdot F$ where F is the reference or clock frequency which controls divider 7a and in turn results from the rapid division by k, in a divider 9, of the frequency kF of an oscillator 8.

Following detection of the error word $M_o$[... dcba], we establish the different delays with the aid of cascaded dividers 7b, 7c, ..., 7o, 7p identical with unit 7a, whose outputs follow one another in series on the $2^p$ inputs $E_b$ of multiplexer 6. To the binary word [... dcba] there corresponds, at the output Σ of the multiplexer, a delay $[1+a(2°)+b(2^1)+c(2^2)+d(2^3)+ ...]$ $(T_d)_{min}$ emitted pulse $I_r$.

This circuit invariably introduces a predetermined supplemental delay equal to $(T_d)_{min}$ which is to be taken into account in the on-board apparatus.

The period (1/kF) must be less than $\Delta t=(2 \Delta D/c)$, ΔD denoting the admissible error in the distance measurement.

In practice, to obtain the factor P one uses a divider commonly employed in the art; k is chosen among the lowest integers.

By way of example, if
$(T_d)_{min}=19.75$ μs and
$\Delta t=0.05$ μs,
with a 16×16 matrix 4b (FIG. 1) and k=2, one obtains F=12,959 MHz and
kF=25,917 MHz (1/kF) being well below 0.05 μs).

Having described the principal features of our invention, we shall now examine how they are introduced into a conventional DME or TACAN beacon.

Figure 6:
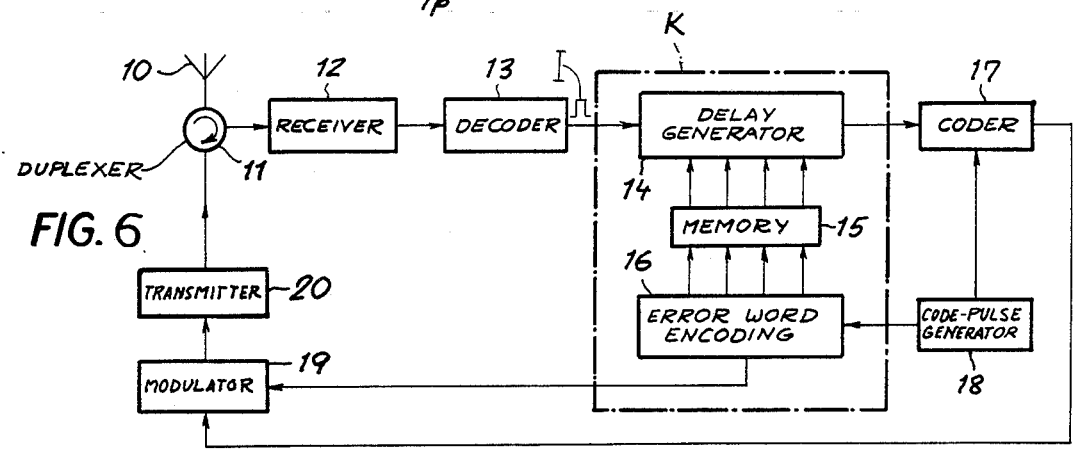
FIGS. 6 and 7 represent synoptic diagrams of the layout of a beacon incorporating respective devices for the introduction of the error $T_d$ and of the error $T_g$.

FIG. 6, where the known elements are shown highly schematically, indicates in a synoptic manner the layout of such a beacon.

A transmitting-receiving antenna 10 receives the HF signals modulated by the pairs of interrogation pulses which, via a duplexer 11, are detected, recognized and put into shape in a receiver 12 and then sent to a decoder 13. At the output of decoder 13 there appears a pulse I, possibly delayed by the time $t_o$ (e.g. 60 μs), which serves as a reference pulse for the preparation of the coded response pulse. I is injected into a delay generator 14 which is programmed by the binary word $M_o$ inscribed in a memory 15. Word $M_o$ is formed in an encoder 16 which corresponds to the assembly of FIG. 1 (generation of words $A_o$ and $M_o$, distortion, formation and storage of the word $A_s$).

The pulse I delayed by time $T_d$, issuing from unit 14, is sent to a coder 17 which produces the coded response pulses; these pulses enter a modulator 19 coupled to the transmitter 20 whose output is connected, via the duplexer 11, to the antenna 10.

The beacon periodically sends out Morse codes giving, among other information, its indentity.

The special code pulses generated in a component 18 pass through the coder 17 whose operation as a coder of responses formed in unit 14 they temporarily inhibit.

Code-pulse generator 18 produces, in synchronism with the Morse code, a peak at times that are multiples of S (30 seconds, for example) which acts upon encoder 16 in a manner causing the generation of a new error word $M_o$ and initiating the process of forming the error-support word $A_s$ and the trains of (q+n) emitted pulses.

The elements 14, 15 and 16, embodying our invention, lie in a dotted frame K which symbolizes the "black box" to be added to the conventional beacon.

Figure 7:
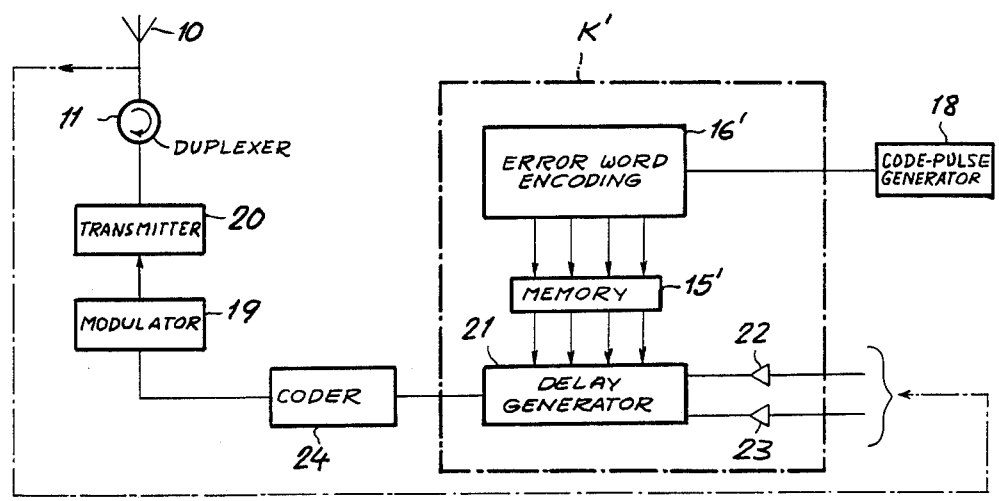

In a TACAN beacon, the introduction of the errors $T_g$ can be performed according to the showing of FIG. 7. The elements 10, 11, 18 and 19 are the same as those of FIG. 6.

Element 18 produces a peak at times that are multiples of S which acts upon an encoder 16' having the same construction as encoder 16 of FIG. 6; there is formed a word $M'_o$ which is inscribed in a memory 15'.

The process of forming the error-support word $A'_o$ of the transformed word $A'_s$ and its emission is the same as that already described.

The principal and auxiliary reference synchronization pulses generated by the rotating antenna 10, according to the specific procedure of TACAN, are fed to the inputs 22 and 23 of a delay generator 21 programmed by the binary word $M'_o$ inscribed in memory 15'.

These reference synchronization pulses, delayed by the time $T_g$ in unit 21, are coded in unit 24 and then transmitted, according to the customary procedure, after passage through elements 19, 20, 11 and 10.

The elements 15', 16' and 21 embodying our invention lie in a frame K' which again symbolizes the "black box" to be added to the conventional beacon.

In practice, one will not utilize two different pairs of elements 15-16 and 15'-16' since the same binary word $M_o$ can be employed for transmitting two different informations $T_d$ and $T_g$.

The two diagrams can be regrouped with a single pair of elements 15-16. The black box to be added to the conventional TACAN beacon will then comprise the elements 16, 15, 14 and 21.

THE ON-BOARD APPARATUS

It comprises means for deciphering the error word $M_o$, for treating the numerical signals in order to eliminate the errors $T_d$ and $T_g$, and for storing the information with each change of $M_o$.

Two types of solutions can be proposed:
a first solution, by the addition of a "black box" incorporating the elements of the invention to the conventional elements of a usual on-board TACAN receiver,
a second solution with application of a few internal modifications to this usual receiver.

Figure 8:
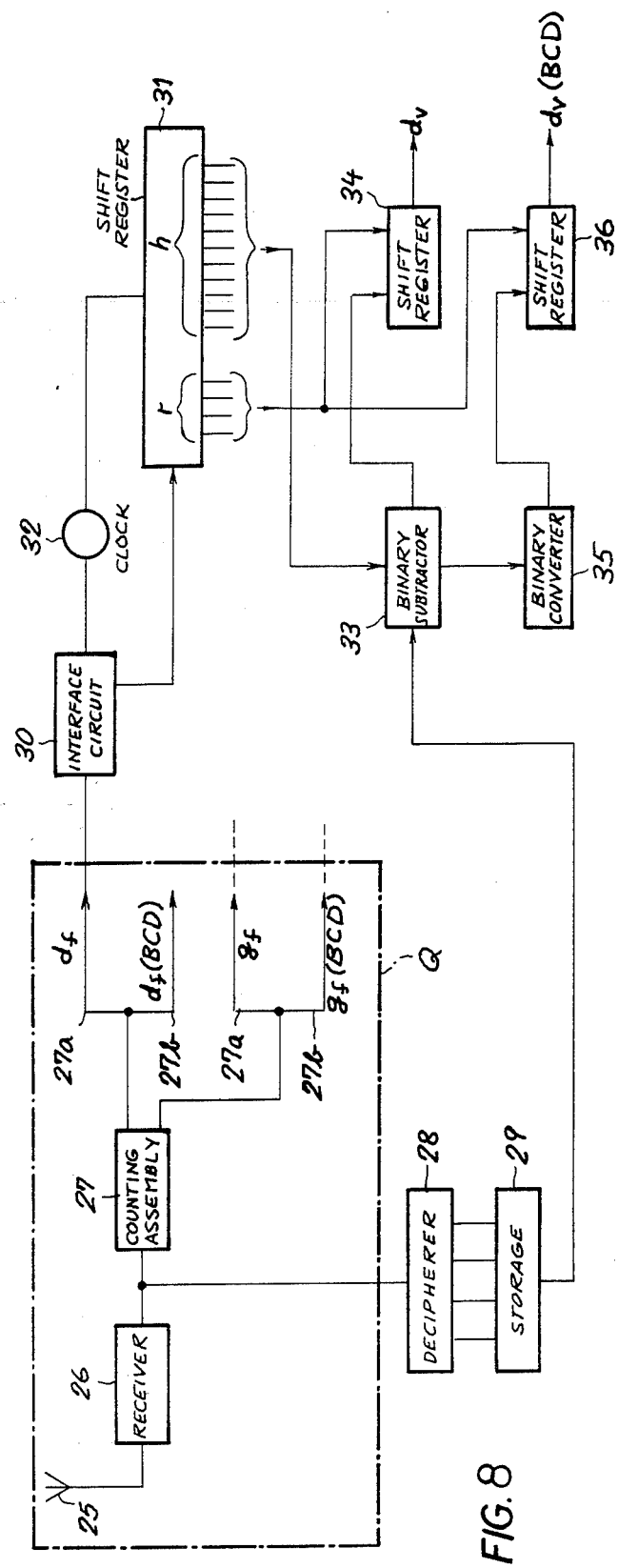
FIGS. 8 and 9 represent synoptic diagrams showing the layout of on-board apparatus equipped with devices for recognizing and subtracting the errors $T_d$ and $T_g$.

FIG. 8 gives a synoptic diagram of a receiver according to the first solution.

The signals originating at a beacon are intercepted an antenna 25, detected, recognized, put into shape and decoded in a receiver 26 whose output is connected to a counting assembly 27, forming part of an evaluator, which emits at its output the measurements of distance $d_f$ and bearing $g_f$, either in purely binary form (27a) or in BCD-coded form (27b).

The elements 25, 26 and 27, surrounded by the a frame Q, represent the usual principal elements of an on-board TACAN apparatus.

The output of receiver 26 is connected to a decipherer 28 similar to the one of FIG. 4 and the error word $M_o$ of p=4 bits is stored in a component 29.

The distance information $d_f$ which comprises the error $\delta = (C/2)T_d$, introduced by the beacon, is contained in a serial binary word comprising (r+h) bits, i.e. r initial "label" or state bits imposed by the international standards and the number h of information bits defining the distance. h is normally equal to 15 since $2^{14}$ measures the ratio between the maximum range (about 200 nautical miles) and the "quantum" of distance ((1/80) nautical mile).

By way of an interface circuit 30, the serial word of (r+h) bits loads in series a shift register 31 controlled by a clock 32. The series word, after (r+h) clock cycles, is inscribed on the parallel stage outputs of register 31, the r "label" or state bits on one side and the h distance bits on the other side.

The word of h bits thus formed is applied to a binary subtractor 33 which also receives the error word $M_o$ representing the artificial delay $T_d$ to be eliminated.

This subtractor is of simple construction since, given the choice of error "steps" equal to $2^7$ "quanta", the error to be eliminated is can be written:

000, 0dcb, a000, 0000

The result of subtraction, which gives the true distance expressed in binary form, and the word formed by the r "label" or state bits are regrouped on the parallel stage inputs of a shift register 34 from whose output the reconstituted word $d_v$ representing the true-distance information is serially recovered.

The result of the subtraction carried out in unit 33 is further applied to a binary BCD converter 35.

The output of converter 35 and the "label" or state word of r bits are regrouped on the parallel inputs of a shift register 36 and the reconstituted word $d_v$ (BCD), which contains the true-distance information expressed in BCD code, is serially recovered at the output thereof.

The items of information $g_f$ and $g_f$ (BCD) can be treated in a similar manner to reconstitute the true bearing data expressed in binary form and BCD code.

Figure 9:
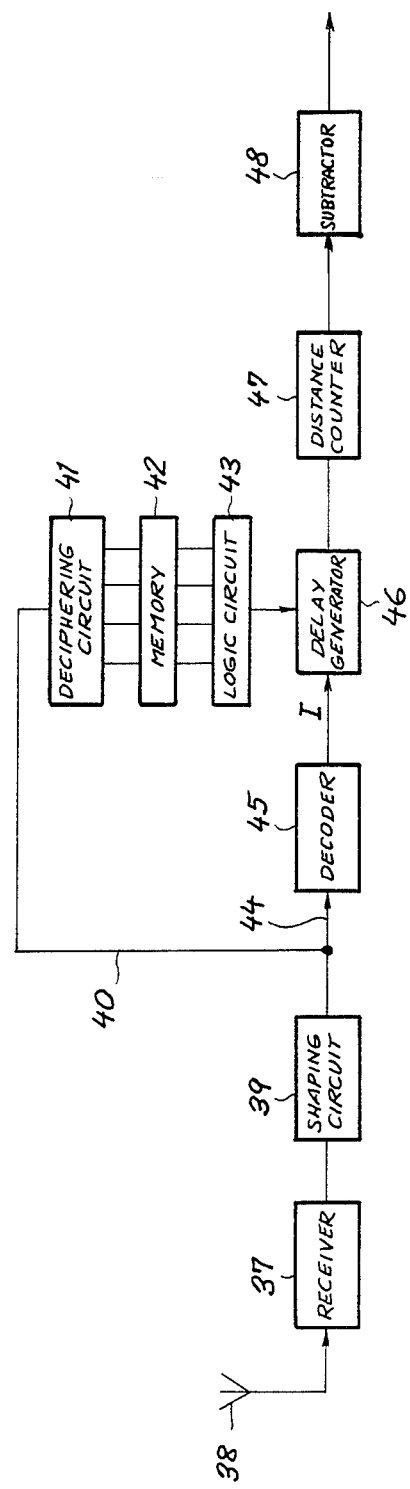

An example of the second solution, which consists in applying a modification to the on-board apparatus, is schematically represented in FIG. 9.

A receiver 37 detects and recognizes the items of information obtained from the beacons by an antenna 38. The signals exiting from receiver 37 are put into shape in a circuit 39. A path 40 collects at the output of shaping circuit 39 the error-support words $A_s$ which are the carriers of the distorted error words. The deciphering is performed in a circuit 41, similar to that of FIG. 4; the deciphered error word $M_o$ of 4 bits is inscribed in a memory 42 which is associated with a logic circuit 43 giving at its output the 10,000-complement of $M_o$ (10,000 being the equivalent of binary 16).

On a path 44, the coded response pulses issuing from circuit 39 are decoded in a component 45. The pulse I issuing from decoder 45 arrives with a delay corresponding to the true distance D increased by the delay $[1+a(2^o)+b(2^1)+c(2^2)+d(2^3)]\ (T_d)_{min}$ created by the beacon. Beyond decoder 45, the pulse I traverses a delay generator 46 of the same type as that of FIG. 5 which, however, is programmed by the 10,000-complement of word $M_o$ produced by logic circuit 43. Component 46 introduces a supplemental delay:

$$[1+1(2^4)-a(2^o)-b(2^1)-c(2^2)-d(2^3)]\ (T_d)_{min}.$$

Altogether, at the output of delay generator 46, the overall supplemental delay amounts to:

$$\tau_s = [(1+1+1(2^4)]\ (T_d)_{min} = 18\ (T_d)_{min}$$

Thus, there occurs a constant delay independent of the error $T_d$ introduced by the beacon.

The pulse I so delayed, issuing from unit 46, is applied to a distance counter 47. At the output of counter 47, the measured distance entails an error $(C/2\tau_s)$; this error is eliminated in a subtractor 48 at whose output the true delay appears. The signal issuing from subtractor 48 is treated in the usual way in order to present the distance information in binary or BCD code.

A similar device can treat the bearing information arriving from the beacon.

Although the principles of the present invention have been described hereinabove with reference to particular embodiments, it will be clearly understood that this description is given solely by way of example and does not limit the scope of the invention.

We claim:

1. In a radionavigation system wherein a ground station includes transmission means responsive to interrogation pulses from passing aircraft for emitting outgoing signals enabling evaluating means aboard said aircraft to derive positional information from the timing thereof, the improvement wherein said ground station comprises error-generating means for introducing an artificial delay into the emission of said outgoing signals to falsify the positional information conveyed thereby, said transmission means receiving from said error-generating means a binary message representing the magnitude of said artificial delay in coded form for communication to on-board equipment of interrogating aircraft, the on-board equipment of privileged aircraft including error-eliminating means for extracting said magnitude from said binary message and controlling said evaluating means to correct the falsified positional information derived from said outgoing signals.

2. The improvement defined in claim 1 wherein said error-generating means comprises a source of randomly generated error words, first storage means for preserving over a predetermined period an original error word generated at the beginning of said period, encoding means for subjecting said original error word to a predetermined series of transformations, thereby producing a modified error word to be communicated to said on-board equipment as part of said binary message, and timing means connected to said first storage means for establishing said artificial delay under the control of said original error word; said error-eliminating means comprising decoding means complementary to said encoding means for subjecting the modified error word received with said binary message to a series of reverse transformations restoring said original error word, second storage means for temporarily preserving the restored error word, and corrective means connected to said second storage means for eliminating said artificial delay under the control of the restored error word.

3. The improvement defined in claim 2 wherein said original error word consists of a group of bits appearing in p selected positions of an original support word of n bits randomly generated by said source, with n>p, said modified error word consisting of p bits appearing in said selected positions of a distorted n-bit support word derived from said original support word by said encoding means under the control of said original error word and of the bits appearing in said selected positions after each transformation.

4. The improvement defined in claim 3 wherein said encoding means comprises a first shift register with n cyclically interconnected stages loadable by said source, a first transcoder with p inputs connected to respective stage outputs of said first shift register corresponding to said selected positions and with p outputs connected to respective first logic circuits inserted between pairs of consecutive stages of said first shift register, and first clock means for unidirectionally circulating the bits in said first shift register by one stage at a time in s successive cycles during said predetermined period with modification of bits passing through said first logic circuits in dependence upon the bits of transformed error words appearing in the p outputs of said first transcoder; said decoding means comprising a second shift register having n cyclically interconnected stages loadable with the bits of said distorted support word, a second transcoder with p inputs connected to respective stage outputs of said second shift register carrying the bits of said modified error word and with p outputs connected to respective second logic circuits inserted between pairs of consecutive stages of said second shift register, and second clock means for unidirectionally circulating the bits in said second shift register by one stage at a time in s successive cycles with modification of bits passing through said second logic circuits in dependence upon the bits of reconverted error words appearing in the p outputs of said second transcoder.

5. The improvement defined in claim 4 wherein each of said transcoders comprises a matrix with $2^p$ rows and $2^p$ columns forming $2^p$ junctions therebetween, a binary-decimal decoder interposed between said p inputs and said $2^p$ rows, and a decimal-binary coder interposed between said $2^p$ columns and said p outputs.

6. The improvement defined in claim 3, 4 or 5 wherein p=4.

7. The improvement defined in claim 4 or 5 wherein said logic circuits are Exclusive-OR gates.

8. The improvement defined in claim 3, 4 or 5 wherein said timing means comprises a reference oscillator, a cascade of $2^p$ frequency dividers connected to said reference oscillator, and a multiplexer with data inputs respectively connected to the outputs of said frequency dividers and with address inputs connected to receive the bits of said original error word contained in said first storage means.

9. The improvement defined in claim 3, 4 or 5 wherein said corrective means comprises a multiplexer with data inputs respectively connected to the outputs of $2^p$ frequency dividers connected in a cascade to a reference oscillator, said multiplexer having address inputs connected to receive the complement to $2^p$ of the restored error word contained in said second storage means.

10. The improvement defined in claim 2, 3, 4 or 5 wherein said corrective means comprises a binary subtractor connected to said evaluating means for receiving positional-information bits therefrom and diminishing the numerical value thereof by that of the restored error word contained in said second storage means.

* * * * *